(12) United States Patent
Schroeder et al.

(10) Patent No.: US 10,088,235 B2
(45) Date of Patent: Oct. 2, 2018

(54) COMPONENT MADE OF A FIBER COMPOSITE MATERIAL CONTAINING WOUND LAYERS AND METHOD OF FABRICATING THE COMPONENT

(71) Applicant: SGL CARBON SE, Wiesbaden (DE)

(72) Inventors: Markus Schroeder, Meitingen (DE); Sebastian Frommelt, Meitingen (DE); Karl Hingst, Meitingen (DE)

(73) Assignee: SGL Carbon SE, Wiesbaden (DE)

( * ) Notice: Subject to any disclaimer, the term of this patent is extended or adjusted under 35 U.S.C. 154(b) by 400 days.

(21) Appl. No.: 14/173,213

(22) Filed: Feb. 5, 2014

(65) Prior Publication Data

US 2014/0154437 A1 Jun. 5, 2014

Related U.S. Application Data

(63) Continuation of application No. PCT/EP2012/065272, filed on Aug. 3, 2012.

(30) Foreign Application Priority Data

Aug. 5, 2011 (DE) .......................... 10 2011 080 507

(51) Int. Cl.
*F27B 14/10* (2006.01)
*B29C 53/60* (2006.01)
*B32B 1/02* (2006.01)

(52) U.S. Cl.
CPC .............. *F27B 14/10* (2013.01); *B29C 53/60* (2013.01); *B29C 53/602* (2013.01); *B32B 1/02* (2013.01); *Y10T 428/13* (2015.01)

(58) Field of Classification Search
CPC ......... Y10T 428/13; B32B 1/02; F27B 14/10; B29C 53/60; B29C 53/602; B29C 53/56
See application file for complete search history.

(56) References Cited

U.S. PATENT DOCUMENTS 4,040,163 A * 8/1977 Tronsberg ............... B29C 33/52
156/173
5,025,943 A 6/1991 Forsman
(Continued)

FOREIGN PATENT DOCUMENTS

DE 10219387 A1 12/2002
EP 0333013 B1 3/1995
(Continued)

OTHER PUBLICATIONS

International Search Report of PCT/EP2012/065272, dated Nov. 22, 2012.
(Continued)

*Primary Examiner* — James C Yager
(74) *Attorney, Agent, or Firm* — Laurence A. Greenberg; Werner H. Stemer; Ralph E. Locher

(57) ABSTRACT

A component made of a fiber composite material contains at least three wound layers made of a fiber material that are arranged one over the other. Each of the wound layers contains one or more windings. For each wound layer containing more than one winding, all windings of the wound layer have the same winding angle and are separated from each other in some sections, whereby intermediate spaces are formed between the windings. All windings of at least two of the wound layers have the same first winding angle. All of the windings of one wound layer, which is arranged between the two wound layers having the windings with a same first winding angle, have a second winding angle. The magnitudes of the first and second winding angles differ, and the windings having the second winding angle intersect with the windings having the first winding angle.

20 Claims, 7 Drawing Sheets

(56) References Cited

U.S. PATENT DOCUMENTS

| | | | |
|---|---|---|---|
| 5,385,262 | A | 1/1995 | Coquet et al. |
| 6,755,911 | B2 | 6/2004 | Yamaji et al. |
| 8,424,793 | B2 | 4/2013 | Aiyama |

FOREIGN PATENT DOCUMENTS

| | | |
|---|---|---|
| JP | 637174 S | 1/1988 |
| JP | S637174 U | 1/1998 |
| JP | 11255586 H | 9/1999 |
| WO | 2010125651 A1 | 11/2010 |

OTHER PUBLICATIONS

Weaver A: "Designing for winding", Reinforced Plastics, Elsevier Advanced Technology, New York, NY, US, vol. 40, Nr. 10, Oct. 1, 1996 (Oct. 1, 1996), pp. 28-30,33, XP004141311.

* cited by examiner

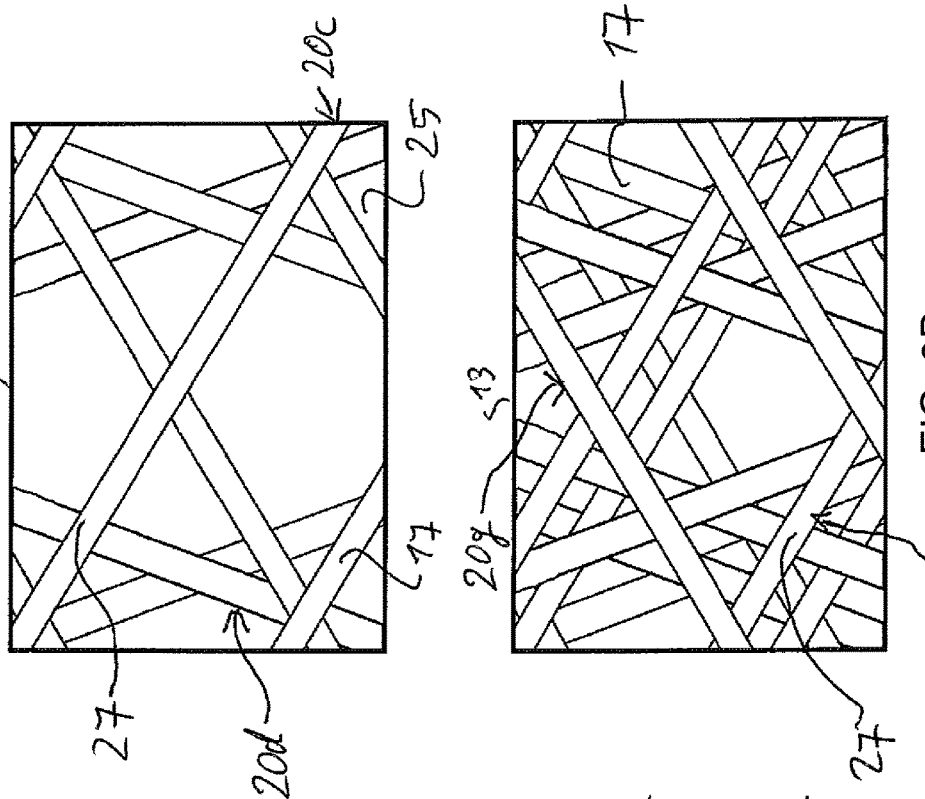
FIG. 9A
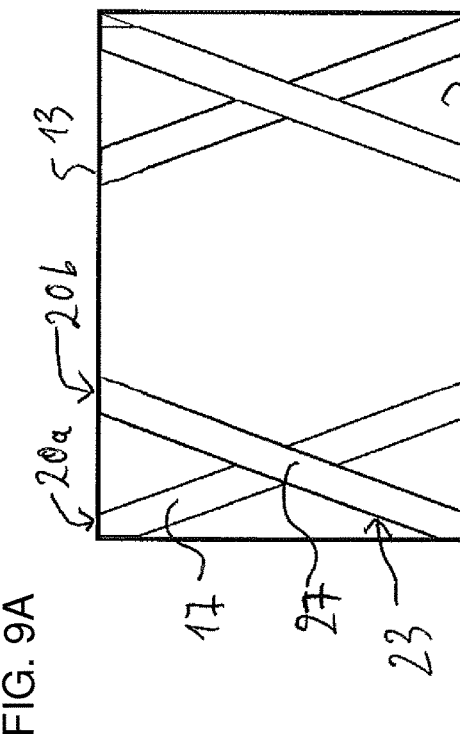
FIG. 9C
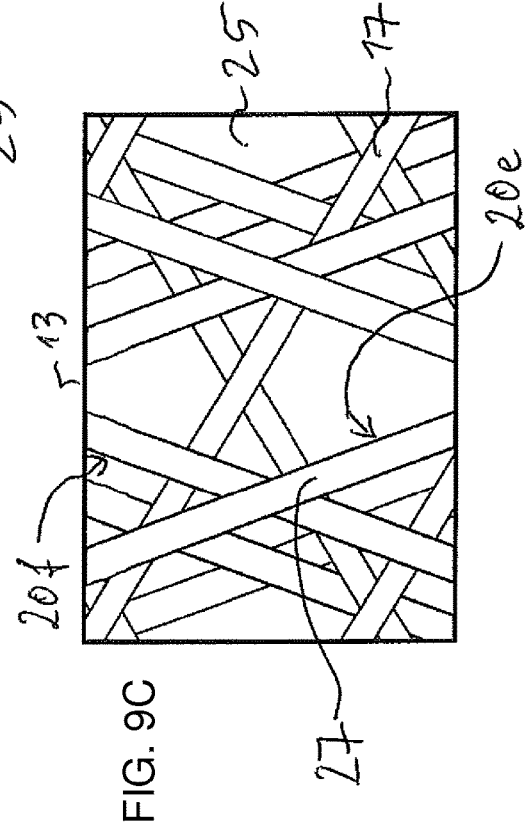
FIG. 9B
FIG. 9D

COMPONENT MADE OF A FIBER COMPOSITE MATERIAL CONTAINING WOUND LAYERS AND METHOD OF FABRICATING THE COMPONENT

CROSS-REFERENCE TO RELATED APPLICATION

This is a continuation application, under 35 U.S.C. § 120, of copending international application No. PCT/EP2012/065272, filed Aug. 3, 2012, which designated the United States; this application also claims the priority, under 35 U.S.C. § 119, of German patent application No. DE 10 2011 080 507.9, filed Aug. 5, 2011; the prior applications are herewith incorporated by reference in their entireties.

BACKGROUND OF THE INVENTION

Field of the Invention

The present invention relates to a component such as, for example, a crucible for melting a metal, made of a fiber composite material containing at least three wound layers of a fiber material that are arranged one above the other, and a method for fabricating such a component.

Wound components made of a fiber composite material are used in various fields of technology, for example, in the fabrication of melting crucibles or pressure containers. Conventionally, in order to fabricate such components, strands optionally impregnated with a binder are wound around a winding core and laid down on this. In this case, the fiber strands, which are also designated as rovings, can contain different individual fibers made of carbon, glass, ceramic or aramid which can be embedded in a matrix of polymer or of ceramic, formed from binders, where the polymer matrix can subsequently be converted into a carbon matrix by carbonization. Hence, the component formed from the wound layers, possibly after removal of the winding core and after appropriate curing and possibly carbonization of the binder, can be constructed of carbon-fiber-reinforced plastic (CFP), carbon-fiber-reinforced carbon (CFC), carbon-fiber-reinforced ceramic or ceramic-fiber-reinforced ceramic (CMC).

Usually each wound layer of such a component contains a plurality of windings which are arranged to run in the same direction, i.e. at least substantially parallel, adjacent to one another or overlapping one another so that through each wound layer at least one section of the winding core is completely covered by the fiber material, i.e. without the formation of recesses or intermediate spaces between the windings. In this case, the individual wound layers are wound successively over the winding core, where the individual windings within each layer, as set out, run at least substantially parallel to one another. Here the winding angles of the windings of different wound layers can be the same or different. In the so-called cross-winding, the windings of adjacent wound layers are of the same magnitude but differ in their sign with respect to the same reference axis.

A component of this type or a complete winding containing a plurality of wound layers arranged one above the other in a stack fashion and configured to each be fully covering is known, for example, from European patent EP 0 333 013 B1, corresponding to U.S. Pat. No. 5,025,943.

A disadvantage of these known components is that no mechanical connection exists between the individual wound layers but between the individual wound layers there is at best a relatively weak interaction of chemical and/or physical binding forces, for example, in the form of a binder which adhesively bonds the different wound layers. For this reason, the stability, in particular mechanical strength such as, for example, the impact toughness or the interlaminar shear strength, of the known components of the type mentioned initially is in need of improvement.

SUMMARY OF THE INVENTION

It is therefore the object of the present invention to improve the stability and mechanical strength of wound fiber composite components.

According to the invention, a component made of a fiber composite material contains at least three wound layers made of a fiber material that are arranged one over the other. Each of the wound layers contains one or more windings, wherein for each wound layer containing more than one winding it holds that all windings of the wound layer have the same winding angle and are separated from each other at least in some sections to form intermediate spaces between the windings. All the windings of at least two of the wound layers have the same first winding angle and all of the one or more windings of at least one wound layer, which is arranged between the at least two wound layers having the windings having a same first winding angle, have a second winding angle. The magnitude of the second winding angle is different from the magnitude of the first winding angle. At least one of the windings having the second winding angle intersects with at least one of the windings having the first winding angle.

A wound layer in the sense of the present invention is/are understood as one or more windings which, when the wound layer contains several windings, run at least substantially parallel to one another and therefore do not intersect one another. In the simplest case, therefore, a wound layer consists of a winding, where the windings of the wound layers adjacent to this wound layer necessarily have a different winding angle, i.e. do not run at least substantially parallel to the winding of the wound layer. Alternatively to this, a wound layer in the sense of the present invention can also contain a plurality of windings running at least substantially parallel to one another, i.e. windings each having the same winding angle, where according to the invention at least in some sections, intermediate spaces are present between the individual windings of one wound layer, i.e. the adjacently arranged fiber strand sections of one wound layer have a specific, preferably constant spacing from one another, in plan view of the component. Since all the windings of one wound layer have the same winding angle, the windings within a wound layer do not intersect. The windings within a wound layer preferably overlap apart from a central point about which the winding core is turned during winding. At the aforesaid central point, an unavoidable overlap of the deposited windings can occur.

A winding in this case designates the section of a wound layer which runs completely around the circumferential surface of the winding core or the circumferential surface of the component once. In other words, a winding corresponds to a section of the fiber material deposited by a double stroke of the winding machine.

The winding angle is understood to be that angle at which the individual windings are deposited relative to an in-principle arbitrary reference axis on the winding core. In other words, the winding angle is the angle which the longitudinal axis of the winding occupies in relation to the reference axis at the instant of depositing on the winding core even if the orientation of the winding can still vary slightly due to some slippage of the fiber strand after depositing. If the winding core is configured to be cylindrical, no slippage of the fiber strand occurs so that in this case the winding angle is the angle which the longitudinal axis of the deposited winding adopts in relation to the reference axis.

With reference to the finished component, this means that for components having at least one cylindrically symmetrical section, where the cylindrically symmetrical section or sections account for at least 20% of the total surface of the component, the winding angle in the sense of the present invention is the angle which the longitudinal axis of the section of the winding deposited on the cylindrically symmetrical section(s) adopts in relation to the reference axis, regardless of the orientation of the winding in the sections of the component different from the cylindrically symmetrical sections. For all other components, the term winding angle in the sense of the present invention means the angle between the winding and the geodetic line which completely spans the circumferential surface of the winding core or the circumferential surface of the component in the case of a rotationally symmetrical winding core or component parallel to the axis of rotation of the winding core or component and in the case of a non-rotationally symmetrical winding core or component parallel to the longitudinal axis of the winding core or component. From this it follows, taking into account the preceding definition of the term winding angle, that all windings run substantially parallel whereby it is understood in the sense of the present invention that the standard deviation of the winding angle present at any point of the winding divided by the arithmetic mean of all corresponding winding angles is less than 0.5. This permissible standard deviation from an ideally rectilinear configuration takes into account the fact that during the deposition at a defined angle in particular on regions of curvature such as the transition region between a cylindrical region and a conical region of the circumferential surface of the winding core or component, the windings can slip minimally with the result that a certain slight change in the winding angle can occur inside the winding. In addition to the preceding standard deviation, it also applies according to the present invention that the difference between the maximum winding angle and the minimal winding angle of each winding is less than 1°, preferably at most 0.8°, particularly preferably at most 0.5°, and quite particularly preferably at most 0.2°.

As set out hereinbefore, the winding angle of all the windings of one wound layer is the same amongst one another. In order to again allow for a possible slippage of sections of individual windings after depositing, in the sense of the present invention it is understood by a same winding angle that the winding angles of all the windings inside a wound layer relative to a geodetic reference line which completely spans the circumferential surface of the winding core or the circumferential surface of the component in the case of a rotationally symmetrical winding core or component parallel to the axis of rotation of the winding core or component and in the case of a non-rotationally symmetrical winding core or component parallel to the longitudinal axis of the winding core or component, differ from one another by less than 1°, preferably by at most 0.8°, particularly preferably by at most 0.5° and quite particularly preferably by at most 0.2°.

In a component according to the invention, there is therefore between at least two wound layers having a same first winding angle a wound layer having a second different winding angle. As a result of the intermediate spaces provided between the individual windings of one wound layer according to the invention, the winding patterns of these wound layers set by the different winding angles overlap in a crossover fashion. Since the magnitudes of the first and the second winding angle differ, at the transition of the corresponding wound layers, not only the sign of the winding angle is changed as is the case in the known cross windings. According to the invention, intersections of the windings distributed uniformly over the wound region therefore do not exist, as in a cross winding; on the contrary, in the component according to the invention, non-uniformly distributed intersections of the individual wound layers exist. As a result, among other things a better load distribution and therefore a higher mechanical strength of the component is achieved. This increased mechanical strength already exists when a single fully-covering arrangement of windings is provided.

Due to the type of arrangement of the individual wound layers according to the invention, the sharp separation of the individual wound layers such as occurs in the windings known from the prior art is eliminated so that in each case the fibers of one wound layer engage in one or more of the wound layers located there above and/or there below. As a result, to a certain extent mixed layers or combination layers are formed where as a result, a single continuous total winding is achieved. Thus, a fabric-like braided structure is obtained in which the interlaminar binding is improved compared with the corresponding structures known from the prior art.

Whereas in wound fiber composite components according to the prior art, wound layers significantly separated from one another therefore exist, which are at best bound to one another via chemical and/or physical interactions, in the component according to the invention there is a mechanical interlocking or interleaving between the individual wound layers, whereby a substantially higher stability and mechanical strength, in particular an improved impact toughness and damage tolerance, of the component is achieved. A component according to the invention can therefore also be used for application having maximum loading requirements such as, for example, as a bullet-proof panel.

The side of the intermediate spaces present between the individual windings, i.e. the spacing of the individual fiber strands of a wound layer in plan view of the wound layer as well as the sequence of the individual winding angles or winding patterns between the individual winding layers can fundamentally be varied widely depending on the requirements of the application.

Preferably the complete winding formed from all the wound layers arranged one above the other is free from intermediate spaces in plan view. In other words, the wound layers arranged one above the other completely cover the wound section of the winding core or the wound circumferential surface. The wound layers thus form a recess-free component wall, for example as vessel wall for a crucible. The intermediate spaces between the windings of a wound layer therefore do not serve to produce a component having a perforated wall but for the interleaving receipt of windings of other wound layers.

According to one embodiment of the invention, in each wound layer which contains more than one winding, the ratio of the sum of the areas of the intermediate spaces between the windings in the wound layer to the total area of the wound layer is 0.05000 to 0.99999, preferably 0.90000 to 0.99999, particularly preferably 0.99000 to 0.99999 and quite particularly preferably is 0.99990 to 0.99999. Such area ratios have proved particularly favorable with a view to the stability and mechanical strength of the component.

According to the invention, the winding angles of all the windings within a wound layer differ from one another by less than 1°, preferably by at most 0.8°, particularly preferably by at most 0.5° and quite particularly preferably by at most 0.2°. This favors a uniform mechanical strength of the component.

On the other hand, the magnitude of the second winding angle differs from the magnitude of the first winding angle according to the invention by at least 1°, preferably by at least 2°, particularly preferably by at least 3°, quite particularly preferably by at least 4° and most preferably by at least 5°. In order to achieve a defined interleaving between the wound layers, it is specifically favorable to avoid arrangements of wound layers having all too similar winding patterns.

Preferably at least one winding of at least one of the wound layers at least in some sections engages in at least one intermediate space of a wound layer arranged below and/or above the wound layer. The windings of the corresponding wound layers therefore do not lie strictly stacked upon one another but sections of windings of one wound layer each penetrate into another wound layer so that a firm mechanical connection between the wound layers is obtained.

According to a particularly preferred embodiment of the invention, all the windings of at least one of the wound layers having the windings with the first winding angle engage in the intermediate spaces of the at least one wound layer having the at least one winding with the second winding angle and/or in the intermediate spaces of the further wound layer having the windings having the first winding angle. For this purpose, preferably the windings of the individual wound layers having the first winding angle are arranged offset to one another so that the windings of one of the wound layers containing windings having the first winding angle are arranged over the intermediate spaces of another of the wound layers containing windings having the first winding angle. As a result, a uniform intermeshing of windings relative to the circumferential surface of the winding core or the component and therefore a particularly high strength of the component is achieved.

Each of the wound layers can contain 1 to 2,000, preferably 1 to 250, particularly preferably 1 to 150 and quite particularly preferably 1 to 10 windings. The number of windings is determined in detail by the requirements of the particular application.

Furthermore the component preferably comprises at least 10, preferably 200 to 10,000, particularly preferably 500 to 10,000 and quite particularly preferably 2,000 to 5,000 wound layers arranged one above the other. By adapting the number of wound layers arranged one above the other; a desired wall thickness or a desired mechanical strength of the component can be achieved with predefined strength of the fiber strands.

According to a further preferred embodiment of the invention, in each case one wound layer having the windings with the first winding angle and one wound layer having the windings with the second winding angle are arranged directly above one another in alternating sequence and specifically particularly preferably directly above one another. In this embodiment the resulting winding pattern resembles a cross winding where, however in contrast to a cross winding, the desired interleaving effect is achieved by the different winding angles in terms of magnitude.

At least one additional wound layer can be arranged between the at least two wound layers having the windings with the first winding angle apart from the wound layer having the windings with the second winding angle. By providing such "intermediate layers", the mechanical properties of the component can be influenced in a desired manner. The at least one additional wound layer can contain one or more windings wherein all these windings have a third winding angle whose magnitude differs from the magnitude of the first winding angle and from the magnitude of the second winding angle. In this way, three or more different winding angles can be combined with one another in order to further increase the interleaving effect between the wound layers and thus the component strength.

Preferably all the windings having the second winding angle intersect with at least one winding having the first winding angle. The windings having the second winding angle are therefore not arranged spatially remote from the windings having the first winding angle on the winding core. On the contrary, the windings having different winding angles are superposed on one and the same section of the winding core or component, where as a result of the different winding angles crossover's inevitably result which ultimately improve the connection between the wound layers.

Preferably the fibers are selected from the group which consists of carbon fibers, ceramic fibers, glass fibers, polymer fibers and mixture of two or more of the aforesaid materials, wherein the polymer fibers are preferably polyamide fibers, in particular aramid fibers, polyester fibers, polypropylene fibers, polyacrylonitrile fibers, fibers of oxidised polyacrylonitrile and fibers of copolymers of two or more of the aforesaid materials and mixtures of two or more of the aforesaid materials. Such fiber materials are suitable for providing wound components having high mechanical strength. The mean diameter of the fibers in this case can be, for example, 3 to 20 μm. Fiber bundles can also be used where the average number of fibers per deposited fiber bundle can be between 500 and 400,000, preferably between 1,000 and 50,000 and particularly preferably between 3,000 and 50,000.

A component according to the invention can in particular consist of a carbon-fiber-reinforced carbon (CFC), a carbon-fiber-reinforced plastic (CFP), a carbon-fiber-reinforced ceramic or a ceramic-fiber-reinforced ceramic (CMC). Such composite materials are characterized among other things by a high mechanical and thermal stability, a high shock resistance, a high chemical resistance and a high chemical purity.

The wound layers arranged one above the other form an unsupported winding. That is, the winding core used for winding the fiber material is removed before completing the fabrication of the component so that a cavity enveloped by the wound layers is formed. In this way, the component can be used as a hollow profile or as a container.

According to a further specific embodiment, the component is configured as a crucible for the melting and crystallization of a metal and/or semi-metal.

The invention also relates to a method for fabricating a component made of a fiber composite material, in which at least three wound layers of a fiber material are wound on a winding core, wherein:

for each of the wound layers one or more windings are wound, wherein all the windings of one wound layer which has more than one winding, are wound with the same winding angle and are separated from each other onto the winding core at least in some sections to form intermediate spaces between the windings, and the windings of at least two of the wound layers having the same first winding angle are wound on the winding core and all of the one or more windings of at least one wound layer having a second winding angle, whose magnitude differs from the magnitude of the first winding angle are wound on the winding core in such a manner that this wound layer is arranged between the at least two wound layers having the windings with the first winding angle and at least one of the windings having the second winding angle intersects with at least one of the windings having the first winding angle.

The superposition of different winding patterns in conjunction with the intermediate spaces left inside the wound layers enables an intermeshing of the individual wound layers and thus a certain interleaving or interlocking effect which increases the mechanical stability of the fabricated component.

Preferably the windings of the at least three wound layers are wound on the winding core in such a manner that they completely cover at least a section of the winding core. This section of the winding core forms a continuous recess-free wall on the finished component.

For each wound layer the windings of the fiber material are wound on the winding core separated from one another at least in some sections to form intermediate spaces between the windings so that the ratio of the sum of the areas of the intermediate spaces between the windings in the wound layer to the total area of the wound layer is 0.05000 to 0.99999, preferably 0.90000 to 0.99999, particularly preferably 0.99000 to 0.99999 and quite particularly preferably is 0.99990 to 0.99999. Such surface ratios have provided particularly favorable in regard to the stability of the component.

A method according to the invention can contain as further steps: impregnating the fiber material before, during or after the winding with binder and curing the binder after the impregnating and after the winding of the fiber material.

The impregnation of the fiber material preferably takes place during the winding. Alternatively to this, the winding can also take place with already-pre-impregnated and/or stabilized fiber material (prepegs). Fundamentally, all binders known to the person skilled in the art can be used, where good results are obtained in particular if the matrix material is selected from the group which consists of epoxide resins, phenol resins, vinylester resins, polyester resins, polyurethane resins, benzoxazine resins, novolacs, cyanate ester resins, bismaleimide resins, bisoxalones, polyolefins such as, for example, polypropylene, technical thermoplastics such as, for example, polyamides and any mixtures of two or more of the aforesaid materials. Furthermore, the binders can comprise suitable fillers such as, for example, carbon or graphite particles or ground or short cut fibers. In addition, a suitable additive such as, for example, hardeners, accelerators, emulsifiers, internal separating agents and the like can be added to the binder.

The curing can take place thermally and/or chemically depending on the type of binder.

After the curing, a carbonization and/or graphitization can be carried out in order to convert the matrix material into carbon. In this way, carbon-fiber-reinforced carbon composite materials can be produced. In this case, the carbonization is preferably carried out at a temperature of 400 to 1,200° C. and particularly preferably of 600 to 1,000° C., whereas the graphitization is preferably carried out at a temperature of 1,400 to 3,000° C. and particularly preferably of 1,600 to 2,400° C.

In order to further increase the carbon content of the matrix or increase the density of the fiber composite materials, after the carbonization or graphitization another one or more liquid compaction steps can be carried out using suitable resins and/or pitches. After each such liquid compaction step, a carbonization and/or graphitization is carried out. A method according to the CVI principle ("chemical vapor infiltration") can also be used in order to further increase the carbon fraction in the matrix.

According to a specific embodiment of the invention, for the winding endless fiber strands containing carbon fibers are laid on the winding core.

Before the winding of the wound layers on the winding core in particular a program can be created and/or configured which contains control instructions relating to the winding for an automatic winding machine, wherein the winding of the windings is accomplished by executing the control instructions. The winding process per se can then be carried out fully automatically.

Other features which are considered as characteristic for the invention are set forth in the appended claims.

Although the invention is illustrated and described herein as embodied in a component made of a fiber composite material containing wound layers and method of fabricating the component, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 9A to 9D show side views of a section of a winding core on which two wound layers of a fiber material (FIG. 9A), four wound layers of the fiber material (FIG. 9B), six wound layers of the fiber material (FIG. 9C) and eight wound layers of the fiber material (FIG. 9D) according to another exemplary embodiment are wound.

DETAILED DESCRIPTION OF THE INVENTION

Figure 1:
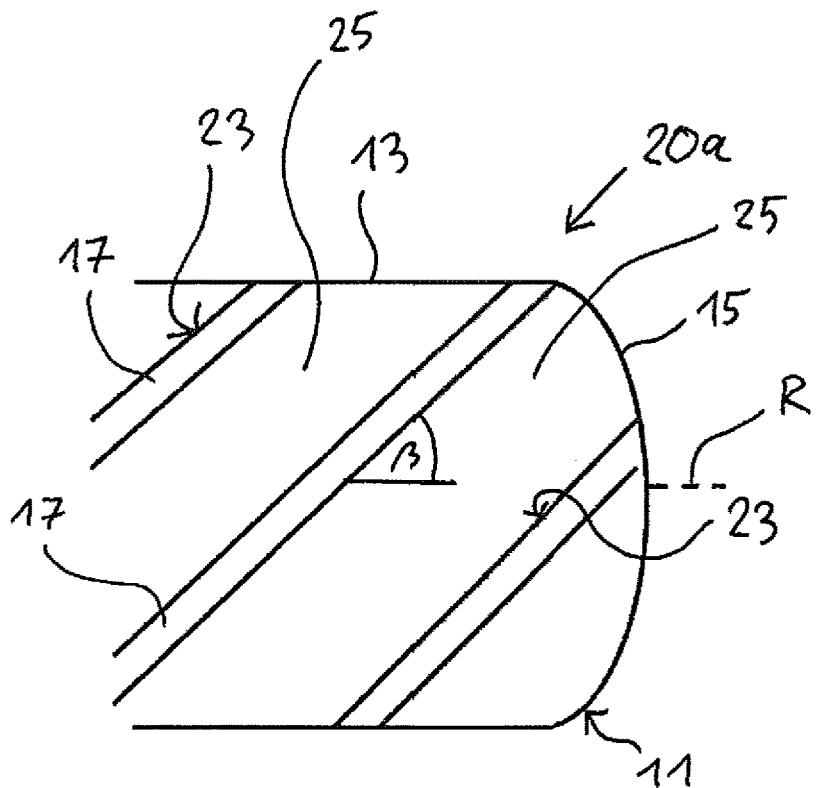
FIG. 1 is a diagrammatic, side view of a winding core on which a first wound layer of a fiber material according to a first exemplary embodiment of the invention is wound.

According to a first exemplary embodiment of the present invention shown in FIGS. 1 to 4, a crucible for melting a metal is fabricated from a fiber composite material by winding a plurality of wound layers of a fiber material onto a winding core or winding mandrel 11. The winding core 11, shown only in part, is a metal hollow body having a cylindrical jacket section 13 and a dome-shaped cover section 15. The winding core 11 is mounted rotatably about an axis of rotation R on a supporting frame not shown, where a feed head of a winding machine also not shown is disposed such that it can deposit endless fiber strands 17 composed of binder-impregnated carbon fibers on the winding core 11. In this way windings 23 which each run once completely around the winding core 11 are formed. During the deposition the endless fiber strands are impregnated with a curable polymer-based binder.

By moving the feed head and by turning the winding core 11 about the axis of rotation R during the deposition of the impregnated endless fiber strands 17 a certain winding angle β is set between a winding 23 and the geodetic line which completely spans the circumferential surface of the winding core 11 parallel to the axis of rotation R.

In this way a first wound layer 20a is wound, whose windings 23 all have a winding angle β of 45°. The endless fiber strands 17 are deposited at a distance from one another so that intermediate spaces 25 exist between the individual windings 23.

In order to achieve a predetermined winding angle which would not be accessible as a result of a relatively small slipping friction of the wound layer on the winding core or on the preceding wound layers, pins or a pin rim can additionally be provided on the winding core, which hold or stabilize the wound layer in a suitable position in relation to the winding core. The use of pins is also particularly advantageous if the change in the winding angle from one wound layer to a next is so large that at as a result of the relatively small slipping friction, no stable holding of the wound layers on the winding core or the preceding wound layers would be possible.

Figure 2:
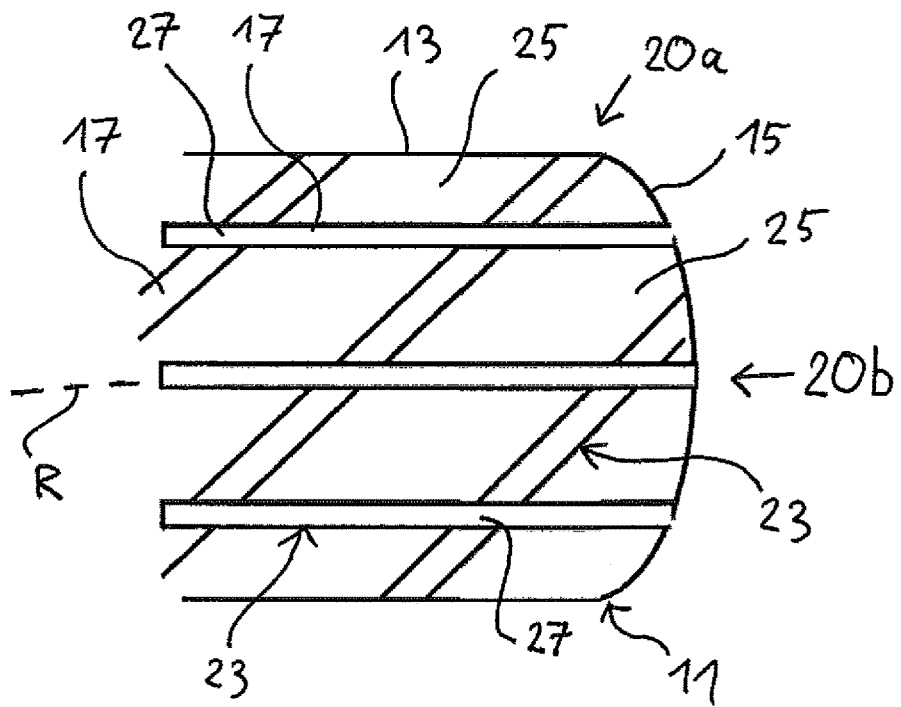
FIG. 2 is a side view of the winding core according to FIG. 1 with an additional second wound layer wound over the first wound layer.

Then, according to FIG. 2 a second wound layer 20b is wound over the first wound layer 20a onto the winding core 11, where the windings 23 of the second wound layer 20b have a winding angle of 0°.

Figure 3:
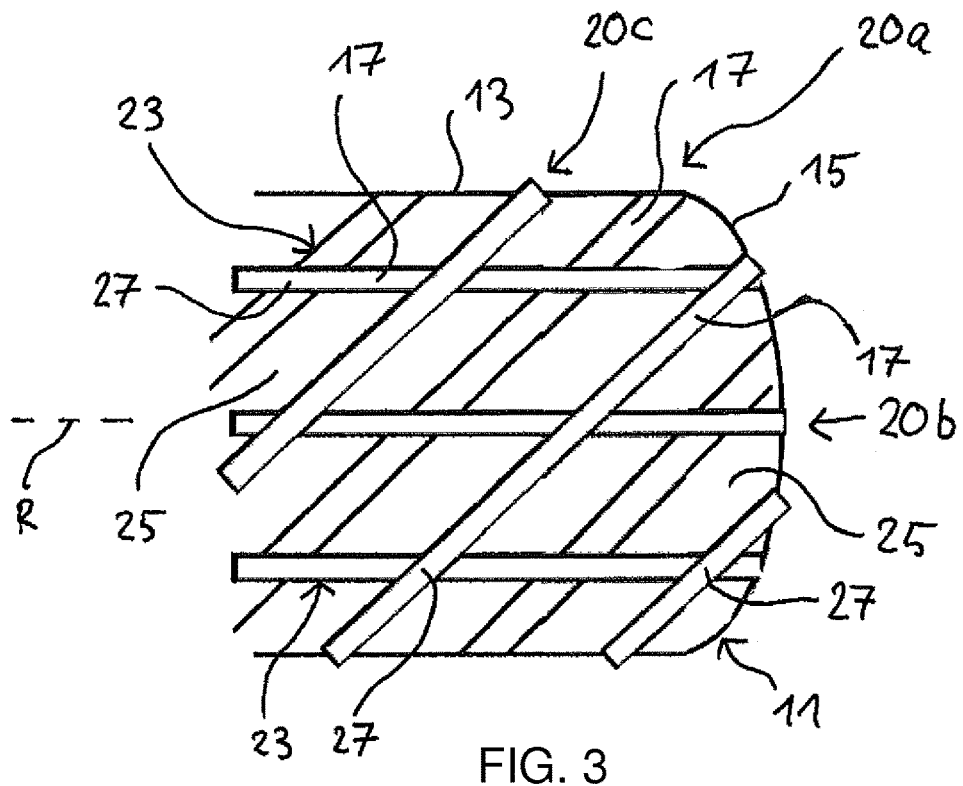
FIG. 3 is a side view of the winding core according to FIG. 1 with an additional third wound layer wound over the second wound layer.

Then according to FIG. 3, a third wound layer 20a is wound over the second wound layer 20b onto the winding core 11. The windings 23 of the third wound layer 20c like the windings 23 of the first wound layer 20a have a winding angle of 45° but are relatively offset to the windings 23 of the first wound layer 20a so that they are located above the intermediate spaces 25 of the first wound layer 20a. In so doing, the windings 23 of the second wound layer 20b are pressed into the intermediate spaces 25 to a certain degree.

Figure 4:
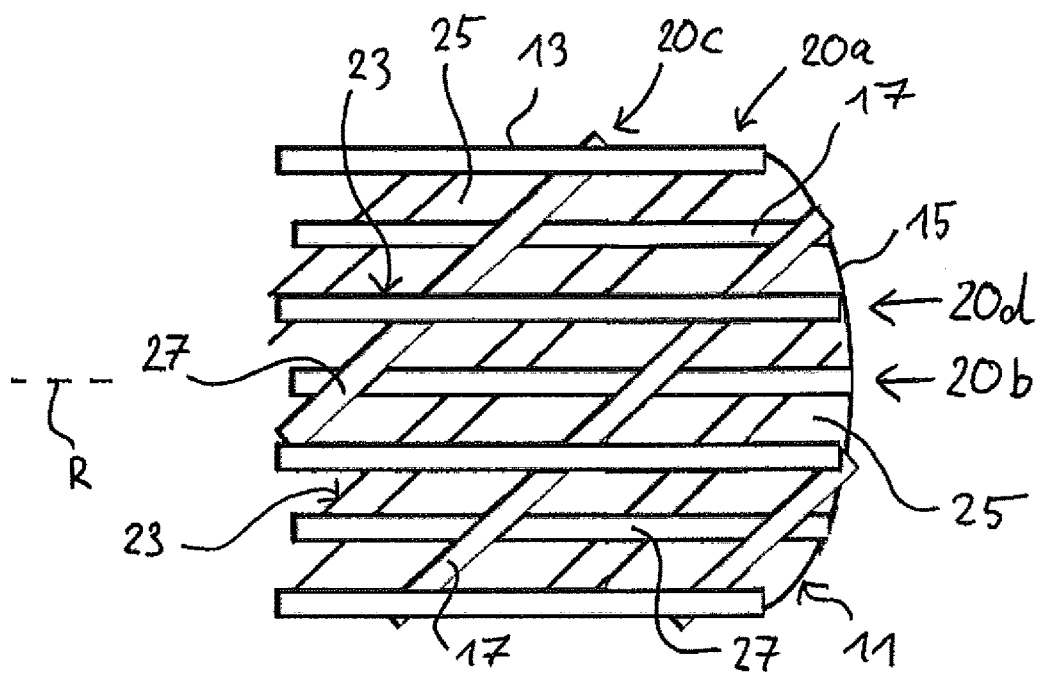
FIG. 4 is a side view of the winding core according to FIG. 1 with an additional fourth wound layer wound over the third wound layer.

Furthermore, according to FIG. 4 a fourth wound layer 20d is wound over the third wound layer 20c onto the winding core 11. The windings 23 of the fourth wound layer 20d like the windings 23 of the second wound layer 20b have a winding angle of 0° but are offset relative to the windings 23 of the second wound layer 20b so that they are located above the intermediate spaces 25 of the second wound layer 20b. The windings 23 of the third wound layer 20b are thereby again pressed into corresponding intermediate spaces 25 located there under.

As a result of the two different winding angles, the windings 23 of the first wound layer 20a intersect with the windings 23 of the second wound layer 20b and the fourth wound layer 20d. Likewise, the windings 23 of the third wound layer 20c intersect with the windings 23 of the second wound layer 20b and the fourth wound layer 20d.

The two alternatively winding angles 0° and 45° are merely shown as an example. An alternative exemplary embodiment of the invention provides that the windings 23 of the first, second, third and fourth wound layer 20a, 20b, 20c, 20d have winding angles which are 0.3°, 2°, 5° and 6°.

Further wound layers are then wound over the existing wound layers 20a, 20b, 20c, 20d until the windings 23 of all wound layers arranged one above the other completely cover the jacket section 13 and the cover section 15 of the winding core 11.

Finally, the binder of the impregnated endless fiber strands 17 is thermally or chemically cured and the winding core 11 is removed. This can be accomplished for example by separating a section of the winding formed opposite the cover section 15 and removing the winding core 11 from the winding so that a hollow body of wound layers arranged one above the other is formed, which forms a crucible. Before or after removing the winding core 11, a carbonization and/or graphitization can additionally take place in order to convert the binder into amorphous carbon or graphite.

Figure 5:
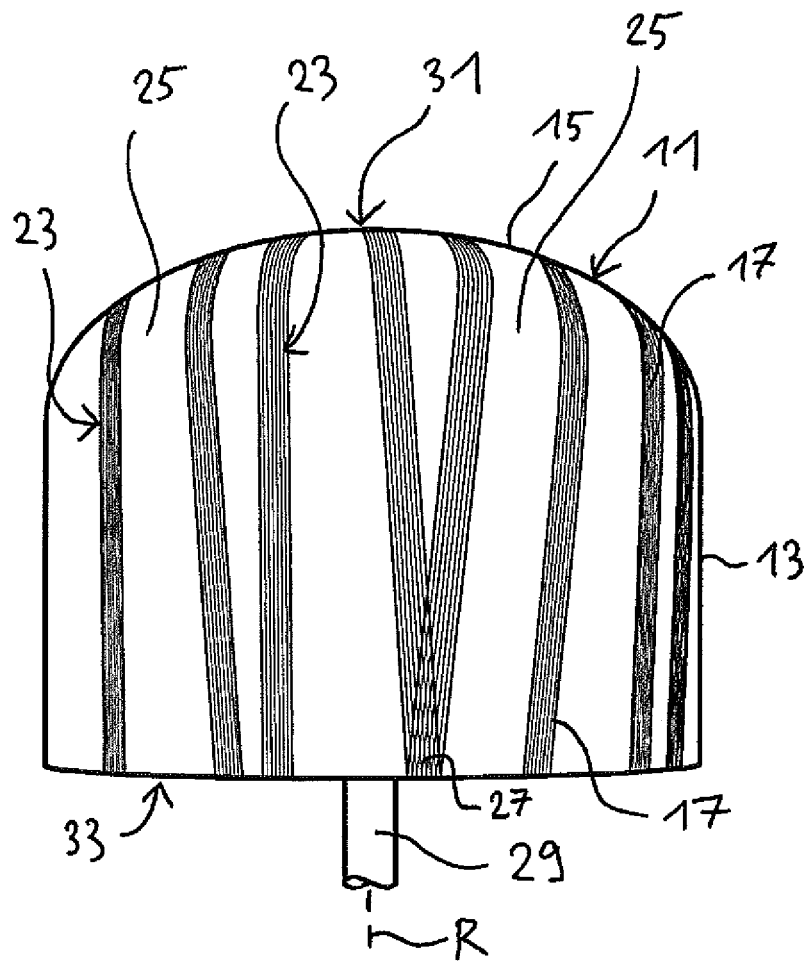
FIG. 5 is a side view of a winding core on which two wound layers of a fiber material arranged one above the other are wound according to a second exemplary embodiment.
Figure 6:
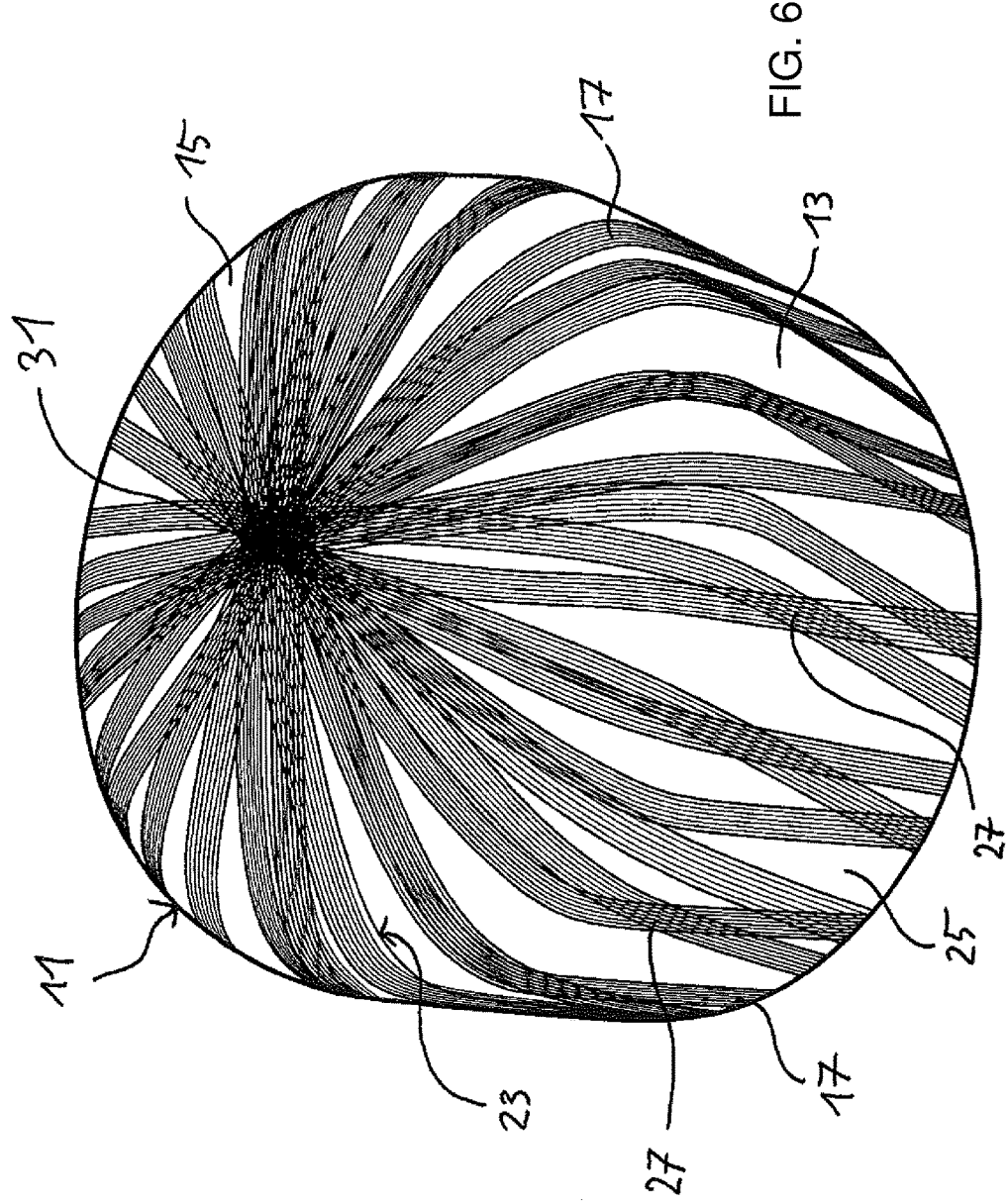
FIG. 6 is a perspective view of the winding core according to FIG. 5.
Figure 7:
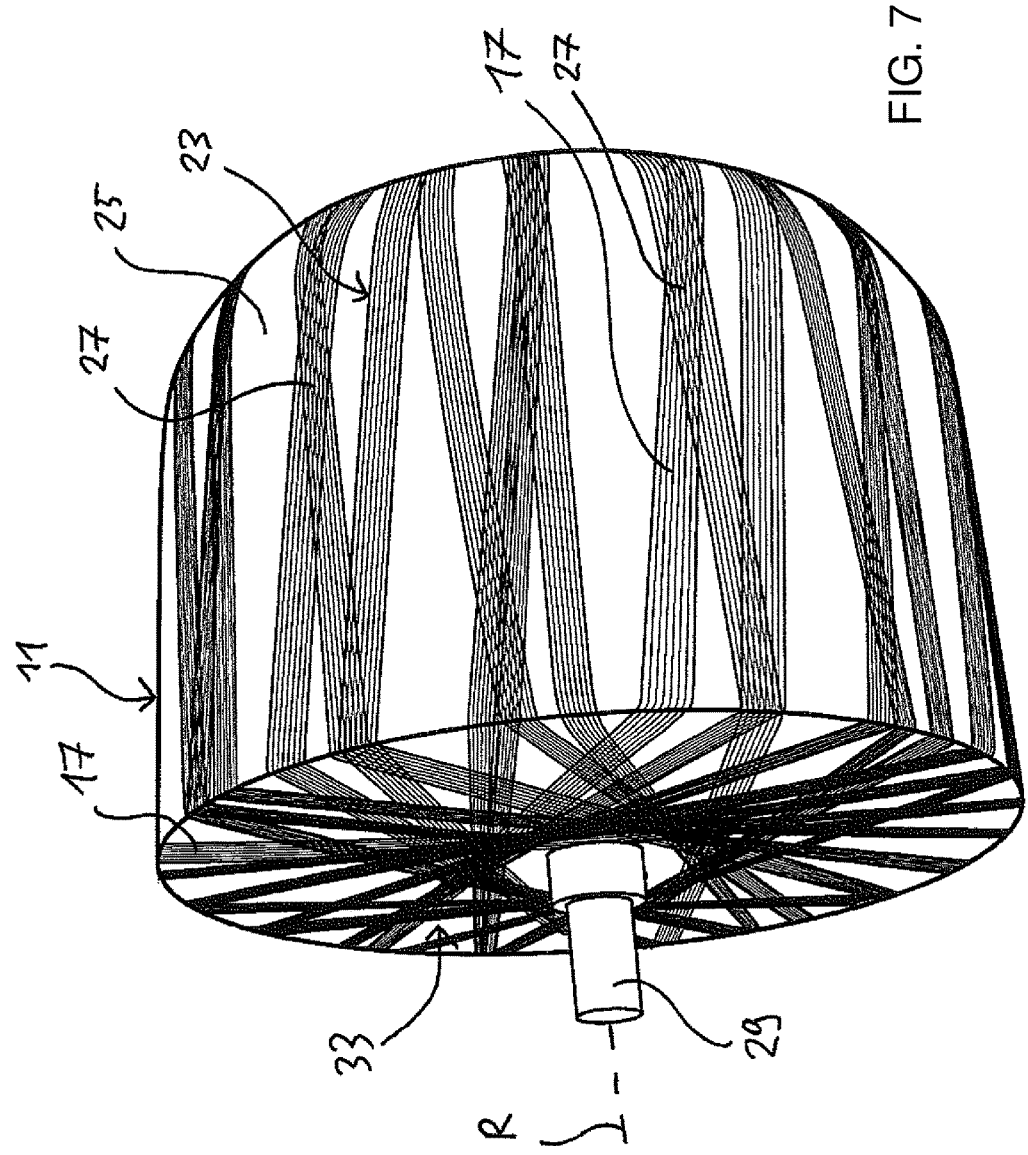
FIG. 7 is a perspective view of the winding core according to FIG. 5 from a different angle.

FIGS. 5 to 7 show another winding core 11 with deposited binder-impregnated endless fiber strands 17, where it can be seen here that the windings are guided over a front-side opening 33 of the winding core 11. A rotatable shaft 29 which defines the axis of rotation R extends through the opening 33. It is additionally deduced from FIG. 6 that unlike in the exemplary embodiment shown in FIGS. 1 to 4, all the windings 23 intersect at a central point 31 at which the axis of rotation R passes through the cover section 15 of the winding core 11.

For the automatic execution of the winding, before the winding of the windings 23 on the winding core 11a computer program is created and/or configured which contains control instructions relating to the winding for the drives of the rotatable shaft 29 and the feed head. The previously described winding of the windings 23 can be carried out fully automatically by executing the control instructions.

Figure 8:
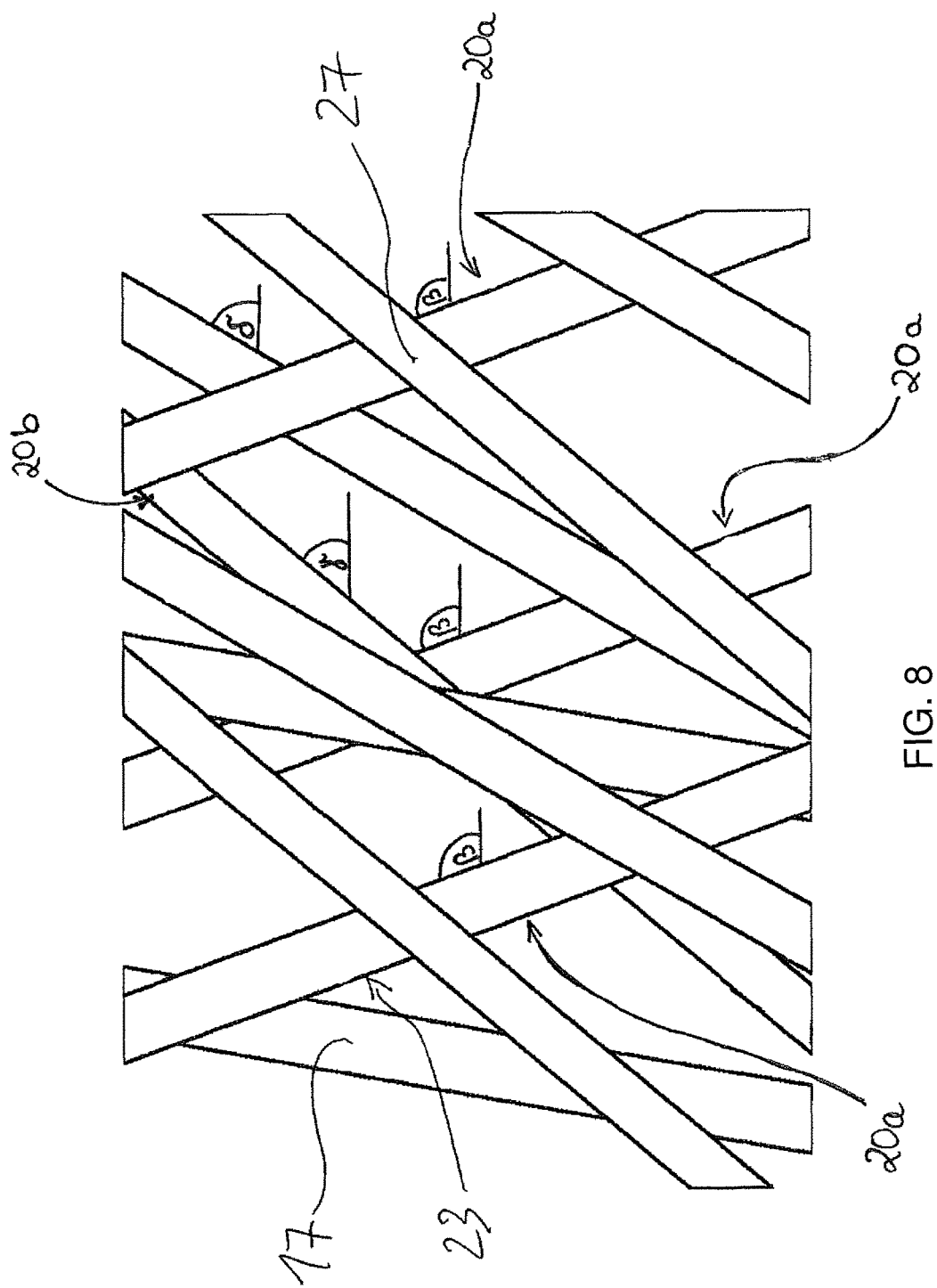
FIG. 8 is a side view of a section of a winding pattern deposited on the winding core according to another exemplary embodiment.

FIG. 8 shows a side view of a section of a winding pattern deposited on a winding core according to another exemplary embodiment. It can be seen from FIG. 8 how the individual wound layers 20a, 20b of the windings 23 intersect with quantitatively different winding angles in each case, where the intersections are distributed non-uniformly with the result that the desired interleaving effect according to the invention is achieved as a result of which the mechanical stability and mechanical strength, in particular impact toughness and damage tolerance of the component are increased.

FIGS. 9A to 9D show side views of a section of a winding core where two wound layers 20a, 20b are deposited in the winding core section shown in FIG. 9A, four wound layers 20a, 20b, 20c, 20d are deposited on the winding core section shown in FIG. 9B, six wound layers 20a, 20b, 20c, 20d, 20e, 20f are deposited on the winding core section shown in FIG. 9C and eight wound layers 20a, 20b, 20c, 20d, 20e, 20f, 20g, 20h are deposited on the winding core section shown in FIG. 9D. Each two of these wound layers 20a and 20b or 20c and 20d or 20e and 20f or 20g and 20h have the same winding angle in terms of magnitude but differ in regard to the sign whereas the other wound layers each have winding angles which differ from this in terms of magnitude. These cross-wound layers in the sense of the present invention each contain two different wound layers. With this winding pattern non-uniformly distributed intersections are also obtained with the result that the desired interleaving effect according to the invention is achieved as a result of which the mechanical stability and mechanical strength, in particular impact toughness and damage tolerance, of the component are increased.

The invention claimed is:

1. A component made of a fiber composite material, comprising:
   at least three wound layers made of a fiber material being disposed one over the other, each of said wound layers having at least one winding, wherein for each of said wound layers having windings all of said windings of said wound layer having a same winding angle and are at a distance from each other at least in some sections to form intermediate spaces between said windings wherein there are interleaved windings of other wound layers, all of said windings of at least two of said wound layers have a same first winding angle and all of said windings of at least one of said wound layers, disposed between said at least two wound layers having said windings with said same first winding angle, have a second winding angle, wherein a magnitude of said second winding angle is different from a magnitude of said first winding angle, and wherein at least one of said windings having said second winding angle intersects with at least one of said windings having said first winding angle, wherein at least one of said windings of at least one of said wound layers at least in some said sections engages in at least one said intermediate space of said wound layer disposed below and/or above said one wound layer; and wherein in each of said wound layers containing said windings, a ratio of a sum of areas of said intermediate spaces between said windings in said wound layer to a total area of said wound layer is 0.05000 to 0.99999.

2. The component according to claim 1, wherein the fiber composite material formed from all said wound layers disposed one above the other does not have holes.

3. The component according to claim 1, wherein said magnitude of said second winding angle differs from said magnitude of said first winding angle by at least 1°.

4. The component according to claim 1, wherein all of said windings of at least one of said wound layers having said windings with said first winding angle engage in said intermediate spaces of said at least one said wound layers having said windings with said second winding angle and/or in said intermediate spaces of a further one of said wound layers having said windings with said first winding angle.

5. The component according to claim 1, wherein each of said wound layers contains 1 to 2,000 windings.

6. The component according to claim 1, wherein the component has at least 10 said wound layers disposed one above the other.

7. The component according to claim 1, wherein in each case one said wound layer having said windings with said first winding angle and one said wound layer having said windings with said second winding angle are disposed directly above one another in an alternating sequence.

8. The component according to claim 7, wherein at least one additional one of said wound layers is disposed between said at least two wound layers having said windings with said first winding angle apart from said wound layer having said windings with said second winding angle.

9. The component according to claim 8, wherein in said at least one additional wound layer containing said windings, all of said windings of said additional wound layer has a third winding angle whose magnitude differs from said magnitude of said first winding angle and from said magnitude of said second winding angle.

10. The component according to claim 1, wherein all of said windings having said second winding angle intersect with at least one said winding having said first winding angle.

11. The component according to claim 1, wherein said fiber material contains fibers selected from the group consisting of carbon fibers, ceramic fibers, glass fibers, polymer fibers and a mixture of at least two of the aforesaid materials.

12. The component according to claim 1, wherein the fiber composite material is selected from the group consisting of a carbon-fiber-reinforced carbon (CFC), a carbon-fiber-reinforced plastic (CFP), a carbon-fiber-reinforced ceramic and a ceramic-fiber-reinforced ceramic (CMC).

13. The component according to claim 1, wherein said wound layers disposed one above the other form an unsupported winding.

14. The component according to claim 1, wherein the component is configured as a crucible for melting and crystallization of a metal and/or semi-metal.

15. A method for fabricating the component of claim 1, the method comprising the steps of:
   winding at least three wound layers of a fiber material one over the other on a winding core, for each of the wound layers at least one winding is wound, and all windings of one wound layer having the windings are wound with a same winding angle and are wound at a distance from each other onto the winding core at least in some sections to form intermediate spaces between the windings, wherein there are interleaved windings of other wound the windings of at least two of the wound layers having a same first winding angle are wound on the winding core and all of the windings of at least one of the wound layers having a second winding angle, whose magnitude differs from a magnitude of the first winding angle are wound on the winding core in such a manner that the one wound layer is disposed between the at least two wound layers having the windings having the first winding angle, and at least one of the windings having the second winding angle intersects with at least one of the windings having the first winding angle least one of the windings of at least one of the wound layers at least in some sections engages in at least one intermediate space of the wound layer disposed below and/or above the one wound layer; and for each of the wound layers, winding at least two of the windings of the fiber material on the winding core at a distance from one another at least in some of the sections to form intermediate spaces between the windings so that a ratio of a sum of areas of the intermediate spaces between the windings in the wound layer to a total area of the wound layer is 0.05000 to 0.99999.

16. The method according to claim 15, which further comprises winding the windings of the at least three wound layers on the winding core in such a manner that the windings completely cover at least a section of the winding core.

17. The method according to claim 15, which further comprises:
   impregnating the fiber material before, during or after the winding with a binder; and
   curing the binder after the impregnating and after the winding of the fiber material.

18. The method according to claim 17, which further comprises performing the curing via thermally and/or chemically.

19. The method according to claim 15, wherein for the winding, endless fiber strands containing carbon fibers are laid on the winding core.

20. The method according to claim 15, which further comprises creating and/or configuring a program containing control instructions relating to the winding for an automatic winding machine before the winding of the wound layers on the winding core, wherein the winding of the windings is accomplished by executing the control instructions.

* * * * *